United States Patent [19]

Richardson

[11] Patent Number: 5,201,860

[45] Date of Patent: Apr. 13, 1993

[54] AIR PURIFICATION PLANTER

[76] Inventor: Dean C. Richardson, 13141 SW. 96th Ave., Miami, Fla. 33176

[21] Appl. No.: 789,947

[22] Filed: Nov. 12, 1991

[51] Int. Cl.[5] ............................................. A01G 27/00
[52] U.S. Cl. .......................................... 47/39; 47/83
[58] Field of Search ...................................... 47/59–65, 47/66, 79, 80, 81–83, 48.5

[56] References Cited

U.S. PATENT DOCUMENTS

| | | | |
|---|---|---|---|
| 3,958,366 | 5/1976 | Meyers | 47/81 |
| 4,100,699 | 7/1978 | Skaife | 47/81 |
| 4,175,356 | 11/1979 | Allen | 47/48.5 |
| 4,435,918 | 3/1984 | Shain | 47/66 |
| 4,584,791 | 4/1986 | Wolf | 47/79 |
| 4,799,822 | 1/1989 | Wintermantel et al. | 47/80 |
| 4,829,709 | 5/1989 | Centafanti | 47/81 |
| 4,975,251 | 12/1990 | Saceman | 47/66 |
| 5,078,972 | 1/1992 | Saceman | 47/66 |

Primary Examiner—David A. Scherbel
Assistant Examiner—Michele A. Van Patten
Attorney, Agent, or Firm—John-Paul J. Violette

[57] ABSTRACT

An air purification planter is disclosed which comprises a receptacle; an aeration assembly; a pot-growing plant; and, a potting media. The receptacle is of the type utilized commercially. A portion of said aeration assembly is sized and proportioned to fit within said receptacle. In the preferred embodiment, a commercial receptacle is perforated near the bottom of said receptacle in order to permit communication of said aeration assembly from the interior to the exterior of said receptacle. The aeration assembly includes an electric fan which connects to the exterior end. The fan draws air through the potting media, by the root system, and through the aeration assembly, and recirculates the cleansed air.

An alternative embodiment of the air purification planter utilizes a totem concept, and, comprises an aeration assembly; and a trellis-growing plant. In the alternate embodiment, the potting media is combined with activated charcoal to be wrapped about said aerating section.

13 Claims, 1 Drawing Sheet

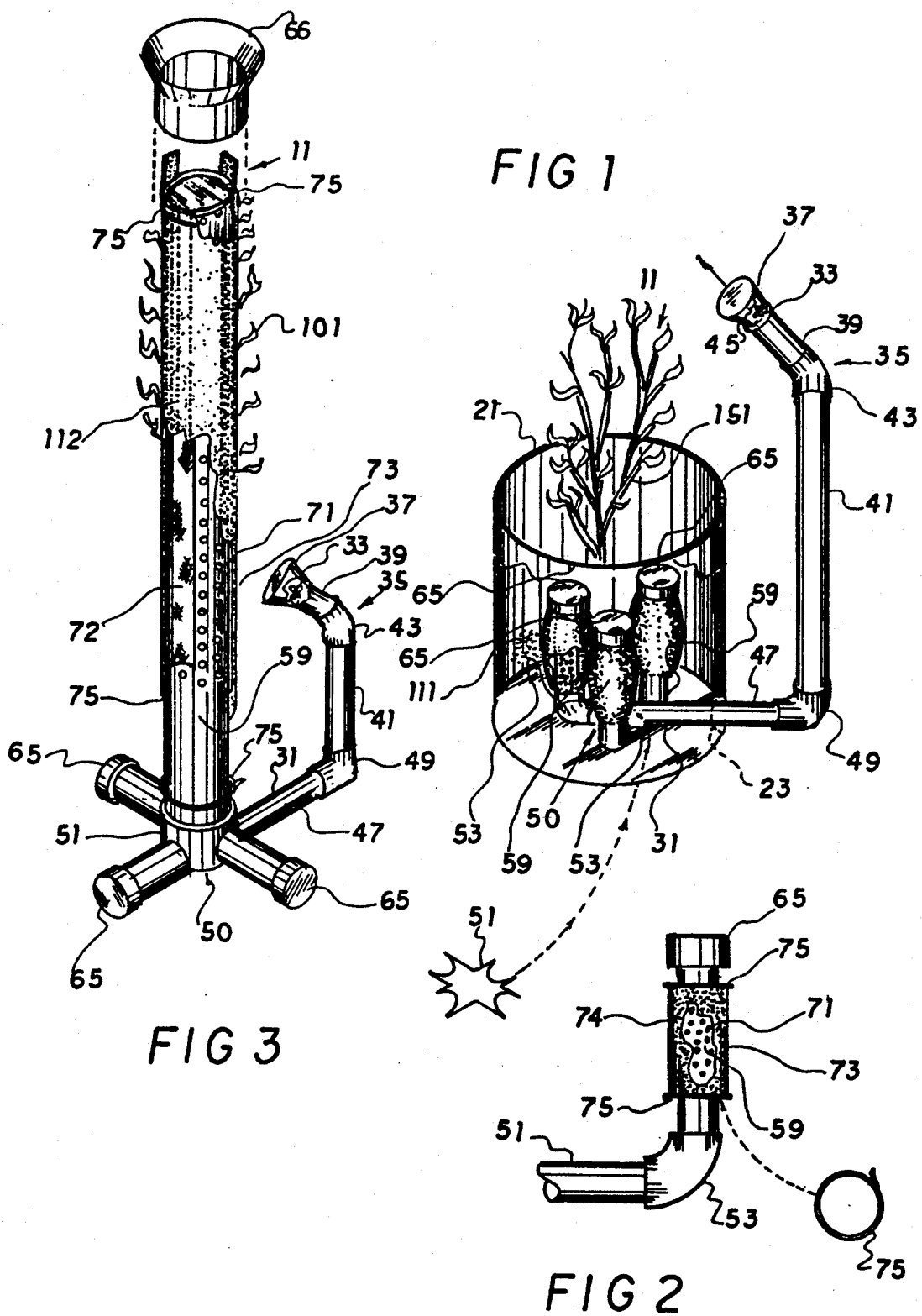

AIR PURIFICATION PLANTER

BACKGROUND OF THE INVENTION

1. Field of the Invention

This invention relates to a device for purifying air; and more particularly to a planter with an aeration system embedded in or near the root system of a plant for funneling air from a room and through an activated carbon mixture in the vicinity of the roots and re-circulated back into the room.

2. Description of the Prior Art

In recent years, there have been a number of green plant systems developed for circulating and purifying air.

Some of those systems have included utilization of activated carbon and/or some method/apparatus for forcing air through the system such as with fans. However, in those cases, the design has necessitated greater structure with limited integration or flexibility with current greenhouse plant planters.

The aforementioned devices have received limited acceptance thus far due in part to the fact that consumers have been required to purchase both a planter and said various apparatuses which has required much greater space and cost than standard planters.

In addition, it has been seen that plants grown in standard planters and then subjected to a different environment as created by the air purification systems do poorly unless they can adjust. Those plants that cannot adjust either die or do not flourish and hence the air purification systems do not perform as desired.

Accordingly, in order to overcome the above set forth problem of space and flexibility, there is a need for a simplified device which is structured to be utilized in conjunction with standard planters as found commonly with commercial plant growers; requires no second pot apparatus; reduces the incidence of plant shock; and, has greater acceptance with growers.

Summary of the Invention

The present invention is directed to an air purification planter for re-circulating and purifying air specifically designed to increase the acceptability by reducing the structure, cost, and plant shock. In addition, the air purification planter of the present invention is structured to be easily integrated with current planters commonly found commercially and at the consumer level.

In operation, the air purification planter is contemplated to be initiated at the commercial grower level where the young plant or seedling is placed into said planter and grown with the air purification planter which may be operated as contemplated by a consumer. The subject planter design enables easy and quick modification of existing planter inventories and less costly, more space efficient, and more unobtrusive than prior air purification systems.

Accordingly, it is the principal object of this invention to provide a simplified device which is structured to be utilized in conjunction with standard pots as found commonly with commercial plant growers; requires no second pot apparatus; reduces plant shock with greater acceptance by growers; is unobtrusive, space efficient, and inexpensive.

BRIEF DESCRIPTION OF THE DRAWINGS

For a fuller understanding of the nature of the present invention, reference should be had to the following detailed description taken in connection with the accompanying drawings in which;

FIG. 1 is a side perspective view of the preferred embodiment of the air purification planter of the present invention wherein the aeration conduits are shown within the container through a partial cutaway and by dotted lines.

FIG. 2 is a side perspective view of one of three aerating columns.

FIG. 3 is a side perspective view of a second embodiment of the air purification planter for trellis-type plants wherein the air conduit and potting media/activated charcoal is integrated with a climbing pole.

Like reference numerals refer to like parts thoughout the several views of the drawings.

DETAILED DESCRIPTION OF THE PREFERRED EMBODIMENT

Referring to FIG. 1, the preferred embodiment of the present invention is directed towards an air purification planter generally indicated as 11 comprising a receptacle 21 sized and proportioned to receive a portion of an aeration assembly 31, a pot-growing plant 101 and, a potting media 111.

The receptacle 21 is preferably made of standard pot materials such as a light-weight, flexible plastic material of the type found in commercial nurseries. Said receptacle 21 includes an opening 23, located along the sidewall and near the bottom of said receptacle, through which a portion of said aeration assembly 31 is insertable for communication of said aeration assembly 31 from the interior of said receptacle 21 to the exterior of said receptacle.

The aeration assembly 31 is primarily comprised of PUC tubing and includes an electric fan 33, a conduit section 35, and an aerating section 50. Said fan 33 is inserted within a removable conical exhaust portion 37 of said conduit section 35 sized and proportioned to receive said fan 33. Said fan 33 is directed with its high pressure (or exhaust) side directed out from said conduit section 35. Said conduit section 35 includes a horizontally extending end portion 39, a vertical portion 41, and an elbow connector 43 connecting said end portion 39 and vertical portion 41. Said conical exhaust portion 37 is slidably attached to said end portion 39 and secured in position with a removable pin 45. Said end portion 39 is rotatable upon said vertical portion 41 and directable for convenience, unobtrusiveness, or for exhaust into a particular area. Said conduit section includes a horizontally extending, insertable portion 47 and a second elbow connector 49. Said second elbow connector 47 connecting said insertable portion 47 to said vertical portion 41. Said insertable portion being insertable through said opening 23 in said receptacle 21.

Said aerating section 50 includes a four-way connector 51, elbow connectors 53 attached to three ends of said four-way connector 51, perforated vertical portions 59, and, removable caps 65 capping respective perforated portions 59. The fourth end of said four-way connector connects to said insertable portion 47 of said conduit section 31. The perforations 71 of said perforated portions 59 are randomly situated, spaced approximately one (1") inch apart, and sized to approximately one-eight (⅛") inch. The sizing and spacing of said perforations 71 are variable depending on type of plant 101 and its root system.

Referencing FIG. 2 and generally FIG. 1, said perforated portion 59 includes a porous, stretchable material 73 such as nylon stocking material, and attachment members 75. Said attachment members 75 tautly secure two layers of said stretchable material 73 to said perforated portion 59. Between said two layers of stretchable material 73, a sufficient quantity of activated charcoal (carbon) shavings (powder) is secured about said perforated portion 59 to cover said perforations 71 with at least a one-quarter (¼") inch layer of said activated charcoal. The activated charcoal may be such as that commonly used with water filters and approximating 3-5 mm particle size.

The preferred plant 101 is one suitably chosen for its root system and its ability to react with activated charcoal to purify air. Such suitability includes plants whose root system do not grow extensively over periods of several years and hence minimize invasion into the perforated portions 59. However, said caps 65 are made removable in order to permit shaving roots extending into the interior of said perforated portions 59, if necessary.

The potting media 111 is one chosen to nourish the plant and aid the activated charcoal and root system in its purification of the air. Standard potting media may be used, such as PROMIX® or a blend may be used, such as 50% cypress bark, 40% Canadian peat, 10% styrofoam balls (such as Airolite®), and, 10% coarse sand. Activated charcoal (carbon) is mixed into the media (as well as surrounding the perforated tubes) at a rate of ½ pound per 14" pot In an alternative embodiment (not shown), the receptacle 21 is a standard pot. Said insertable portion of the aeration assembly 31 is shortened or eliminated such that said vertical portion of said conduit section 35 is directed up the inside wall of the receptacle 21 and out the top to the portion of the aeration assembly external to the receptacle 21. A disadvantage of this design over the preferred embodiment is that a portion of the soil is displaced by the vertical conduit and hence some of the purifying surface.

Referring to FIG. 3, the alternate embodiment of the present invention is directed towards an air purification planter generally indicated as 11 comprising an aeration assembly 31 and a trellis-growing plant 101.

The aeration assembly 31 includes an electric fan 33, a conduit section 35, and an aerating section 50. Said fan 33 is inserted within a removable conical exhaust portion 37 of said conduit section 35 sized and proportioned to receive said fan 33. Said fan 33 is directed with its high pressure (or exhaust) side directed out of said conduit section 35. Said conduit section 35 includes a horizontally extending end portion 39, a vertical portion 41, and an elbow connector 43 connecting said end portion 39 and vertical portion 41. Said conical exhaust portion 37 is slidably attached to said end portion 39 and secured in position with a removable pin 45. Said end portion 39 is rotatable upon said vertical portion 41 and directable for convenience, unobtrusiveness, or for more efficient air exhaust from a particular area. Said conduit section includes a horizontally extending, insertable portion 47 and a second elbow connector 49. Said second elbow connector 47 connecting said insertable portion 47 to said vertical portion 41.

Said aerating section 50 includes a five-way connector 51 where four ends are horizontally disposed providing support as a stand and a fifth centrally located end is disposed vertically, a perforated vertical portion 59, and, caps 65 capping three of the ends of the five-way connector 51, and a cap 66 for capping the perforated portion 59. The fourth of said horizontally disposed ends of said five-way connector 51 connects to said insertable portion 47 of said conduit section 31. The fifth end of said five-way connector 51 connects to said perforated vertical portion 59. The height of said vertical portion 59 is variable depending on the size of the plant desired. The perforations 71 of said perforated portion 59 are randomly situated, spaced approximately one (1") inch apart, and sized to approximately one-eighth (⅛") inch. The sizing and spacing of said perforations 71 are variable depending on type of plant 101 and its root system. Said cap 66 is open-ended and oversized at the upper end in order to facilitate the watering of the plant through the perforated portion 59.

Said perforated portion 59 includes a porous, water-retentive material or wick 72 such as a thick cotton-like material, stretchable material 73 such as nylon stocking material, and attachment members 75. Said attachment members 75 tautly secure two oppositely disposed strips of said water-retentive material 72 and two layers of said stretchable material 73 overlaying said strips of said water-retentive material 72 to said perforated portion 59. Said strips of said water-retentive material 72 extend the length of said perforated portion 59, and further have ends 74 which extend over the lip and into the interior of said perforated portion 59. Said ends 74 of said water-retentive material 72 are fastened as by tape around the top of the perforated portion 59 in order to retain their position when retaining water. Between said two layers of stretchable material 73, a quantity approximating one standard eight (8") inch production pot of potting media including activated charcoal shavings is secured about said perforated portion 59 to cover said perforations 71 with at least a one-quarter (¼") inch layer of said potting media including activated charcoal. The potting media mixture comprises approximately seventy (70%) percent standard potting media, thirty (30%) percent activated carbon, and one (1 oz.) ounce of TERRASORB/SUPERSORB® or similar polymer.

The preferred plant 101 is one suitably chosen for its root system and its ability to react with activated charcoal to purify air. Such suitability includes trellis-type plants whose root system grow upward along the plant and whose roots, once in place, do not grow extensively over periods of several years and hence minimizing invasion into the perforated portion 59.

In the alternative embodiment of FIG. 3, a receptacle 21 may be utilized as in the preferred embodiment for containing any excess water draining from said perforated portion 59 and is preferably made of standard pot materials such as a light-weight, flexible plastic material of the type found in commercial nurseries.

It is therefore to be understood that the following claims are intended to cover all of the generic and specific features of the present invention herein described, and all statements of the scope of the invention which as a matter of language, might be said to fall there between.

Now that the invention has been described,
What is claimed is:
1. An air purification planter comprising
a receptacle;
an aeration assembly;
a pot-growing plant including roots; and,
a potting media;

said potting media and roots of said pot-growing plant being contained by said receptacle;

a portion of said aeration assembly being embedded in said potting media and in proximity to the roots of said pot-growing plant;

said aeration assembly including forced air circulation means for forcing air to circulate through said air purification planter, a conduit section, and an aerating section, said conduit section including an exterior end and an interior end;

said aerating section connecting to said interior end.

2. An air purification planter as in claim 1, said receptacle comprising plastic material.

3. An air purification planter as in claim 1, said receptacle including a sidewall with an opening located near the bottom of said receptacle;

said aeration assembly including an insertable portion;

said insertable portion being insertable through said opening for communication of said aeration assembly from the interior to the exterior of said receptacle.

4. An air purification planter as in claim 1, said conduit section including a removable exhaust portion;

said exhaust portion connecting to said exterior end;
said forced air circulation means being insertable within said exhaust portion.

5. An air purification planter as in claim 4, said exhaust portion including exhaust attachment means for removably attaching said exhaust portion to said exterior end.

6. An air purification planter as in claim 1, said forced air circulation means comprising a fan;

said fan being directed with its high pressure (or exhaust) side directed out of said exterior end.

7. An air purification planter as in claim 1, said conduit section includes a first portion, a second portion, and elbow connecting means for rotatably connecting said first portion and said second portion.

8. An air purification planter as in claim 1, said aerating section including at least one perforated portion; and, conduit connector means for attaching said perforated portions to said conduit section.

9. An air purification planter as in claim 8, said aeration assembly including capping means for removably capping said at least one perforated portion.

10. An air purification planter as in claim 8, said at least one perforated portion being perforated randomly with perforations spaced approximately one (1") inch apart and sized to approximately one-eighth (⅛") inch.

11. An air purification planter as in claim 8, said at least one perforated portion including a first end and a second end;

a layered, porous, stretchable material; and, material attachment means for securing said stretchable material to said first end and said second end.

12. An air purification planter as in claim 11, said porous, stretchable material comprising nylon.

13. An air purification planter as in claim 11, said at least one perforated portion including activated charcoal (carbon);

said activated charcoal being insertable within said layered, stretchable material.

* * * * *